United States Patent
Mendis

(10) Patent No.: US 8,661,121 B1
(45) Date of Patent: Feb. 25, 2014

(54) SYSTEM AND METHOD FOR PROVIDING LOCATION REPORTING SERVICES

(75) Inventor: Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 245 days.

(21) Appl. No.: 13/083,758

(22) Filed: Apr. 11, 2011

(51) Int. Cl.
*G06F 15/16* (2006.01)

(52) U.S. Cl.
USPC ........................................ 709/224; 455/456.1

(58) Field of Classification Search
USPC ................. 709/200–203, 217–227, 228, 229; 455/456.1
See application file for complete search history.

(56) References Cited

U.S. PATENT DOCUMENTS

2006/0229802 A1* 10/2006 Vertelney et al. .............. 701/200
2012/0028650 A1* 2/2012 Cooper et al. ............. 455/456.1

* cited by examiner

*Primary Examiner* — Moustafa M Meky
(74) *Attorney, Agent, or Firm* — McDermott Will & Emery LLP

(57) ABSTRACT

A method and system for reporting a user location are described. Aspects of the invention minimize the need to report a current location of a user device to a remote server by attempting to predict a most likely location or most likely destination of the user device. As long as the user device does not leave a certain area defined in relation to the predetermined location or destination, the user device refrains from reporting to the remote server. The likely location or likely destination may be determined using a schedule generated from heat map information stored on the remote server. The schedule is used to determine where the user is likely to be traveling based upon the user's current location and/or the time of day.

15 Claims, 5 Drawing Sheets

SYSTEM AND METHOD FOR PROVIDING LOCATION REPORTING SERVICES

BACKGROUND OF THE INVENTION

As technology advances, consumer electronics tend to become smaller and less expensive. One technology area where this trend is clear is with regard to positioning technology. For example, early Global Positioning System ("GPS") receiver systems were large and bulky, mainly suitable for use on automobiles, ships, and planes. Hand-held receivers were later developed, and today it is common to have GPS receiver technology integrated with cellular phones and personal digital assistants ("PDA"s).

One consequence of this miniaturization and integration trend is that cross-communication among different devices becomes possible. For example, a cellular phone that can determine its location (whether by GPS or other methods) may then leverage access to the cellular network to send and receive information about that location over the Internet. Access to such a network provides the ability to receive updated maps, access information about the local area (e.g., traffic data, weather forecasts, local business information, etc.), improve route finding functionality, and notify others of the device's current location. However, certain aspects of these functions may require the device to report the device's current location to a remote server.

Due to their mobile nature, portable devices rely heavily on battery power. The acts of determining and reporting the device's location each require active processing, and thus the device must "awake" from a power saving configuration. The more frequent the polling and reporting, the greater the drain on the device's battery.

BRIEF SUMMARY OF THE INVENTION

A method and system for reporting a user location are described. Aspects of the invention minimize the need to report a current location of a user device to a remote server by attempting to predict a most likely location or most likely destination of the user device. As long as the user device does not leave a certain area defined in relation to the predetermined location or destination, the user device refrains from reporting to the remote server. The likely location or likely destination may be determined using a schedule generated from heat map information stored on the remote server. The schedule is used to determine where the user is likely to be traveling based upon the user's current location and/or the time of day.

One aspect of the invention provides a computer-implemented method for reporting a device location. The method includes identifying one or more a geographic locations. The geographic locations indicate at least one of a likely location or a likely destination of a user device. The method further determines whether the user device is within a predetermined area proximate to the one or more geographic locations. If the user device travels more than a particular distance from the one or more geographical locations, the method reports the current location of the user device to a remote server. In one example, the method identifies one or more new geographic locations as the likely location or the likely destination in response to the user device traveling the distance away from the one or more geographic locations outside the predetermined area. In another example, the method reports the likely location or likely destination to the remote server.

Another aspect of the invention provides a computer-implemented method for determining a likely location or destination of a first user device of a plurality of user devices. The method is performed by a processor in communication with a memory. The method comprises storing a current location of the first user device and a set of historical data. The historical data comprises spatial data and temporal data. The spatial data describes one or more geographical locations reported by at least one of the user device and the plurality of user devices, and the temporal data describes times at which the user devices were present at the geographical locations. The method further comprises analyzing the historical data to generate one or more schedules. The schedules comprise times and the geographic locations, where each of the times is associated with at least one of the geographic locations. The method further includes comparing the current location of the first user device to the schedules to determine a most likely location or most likely destination of the first user device.

In one example, the method also determines that the first user device is in motion, and compares the current location of the first user device to the schedule to determine the most likely destination of the first user device. In another example, the comparing step may further be performed by determining the most likely location or destination of the first user device by analyzing the schedule to determine a most frequently visited location or destination associated with a particular time. The particular time may be a local time of the first user device. The particular location may be is the location of the first user device.

In yet another example, the comparing step further comprises applying a bias between temporal factors and spatial factors used to determine the most likely location or destination based upon the contents of the schedule. The comparing step may further include the step of attempting to determine the most likely location or most likely destination using a schedule associated with at least one of a particular user or the first user device.

In some examples, the comparing step may further include the step of attempting to determine the most likely location or most likely destination using a schedule associated with a particular set of demographic data. The comparing step may further attempt to determine the most likely location or most likely destination using a schedule associated with a superset of all available historical data. The determination may be performed using a confidence value for a predicted location or destination based on a comparison with a particular schedule.

In another example, the computer-implemented method further comprises the steps of comparing the confidence value with a threshold value and determining a likely location or a likely destination. The likely location or destination is determined by comparing a confidence value for the location with a threshold value. If the confidence value meets or exceeds the threshold value, the location or destination is determined to be a likely location or likely destination. If the confidence value fails to exceed the threshold value, the method may attempt the comparison using another schedule. The threshold value used for the next schedule comparison may be different than the original threshold value. The method may further include selecting a predicted location with a maximum confidence value from a plurality of predicted locations, in response to none of the plurality of predicted locations exceeding the threshold value.

Another aspect of the invention provides for a processing system for processing personalized user information. The processing system comprises at least one processor, a memory, and a location prediction engine. The location prediction engine is associated with at least one processor and the memory. The memory stores data, and is coupled to the processor. The location prediction engine is configured to analyze a set of historical location data to generate one or more schedules, and compare a current location of a first user device to one or more schedules. The location prediction engine determines a most likely location or destination of the first user device using the comparison. The schedules comprise one or more times and one or more geographic locations, where each time is associated with at least one of the geographic locations.

In some examples, the processing system may be further configured to compare the current location of the user device with at least one location entry within the one or more schedules. The processing system may use the location entry to determine the most likely location or the most likely destination.

DETAILED DESCRIPTION

Embodiments of a system and method for providing improved location reporting are disclosed herein. Aspects of the present invention help to minimize the number of location reports sent to the remote server in order to provide accurate data while maximizing battery life. Battery life is maximized by preventing location reporting when the device is already in a location expected by a remote server. The location or destination of the client may be predicted by performing analysis of one or more schedules representing historical data associated with the client. Different schedules are typically associated with different datasets, including user specific schedules, schedules that are demographically similar to the user's, and schedules that represent data aggregated from all users. Accordingly, the methods and system described herein provide a flexible and efficient way of managing client device location reporting functionality.

Figure 1:
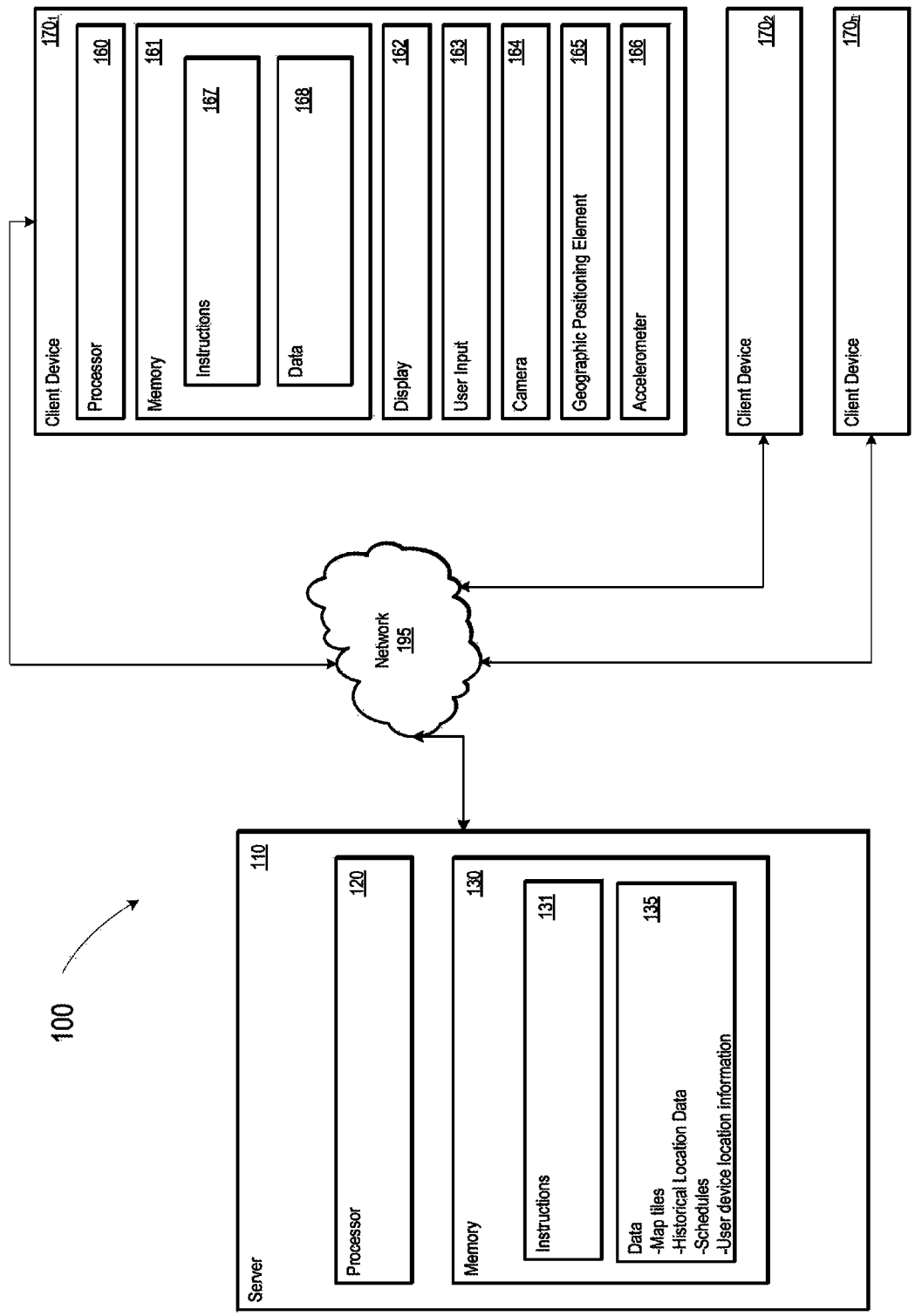
FIG. 1 is an illustration of one example of an server in communication with multiple client devices in accordance with aspects of the invention.
Figure 2:
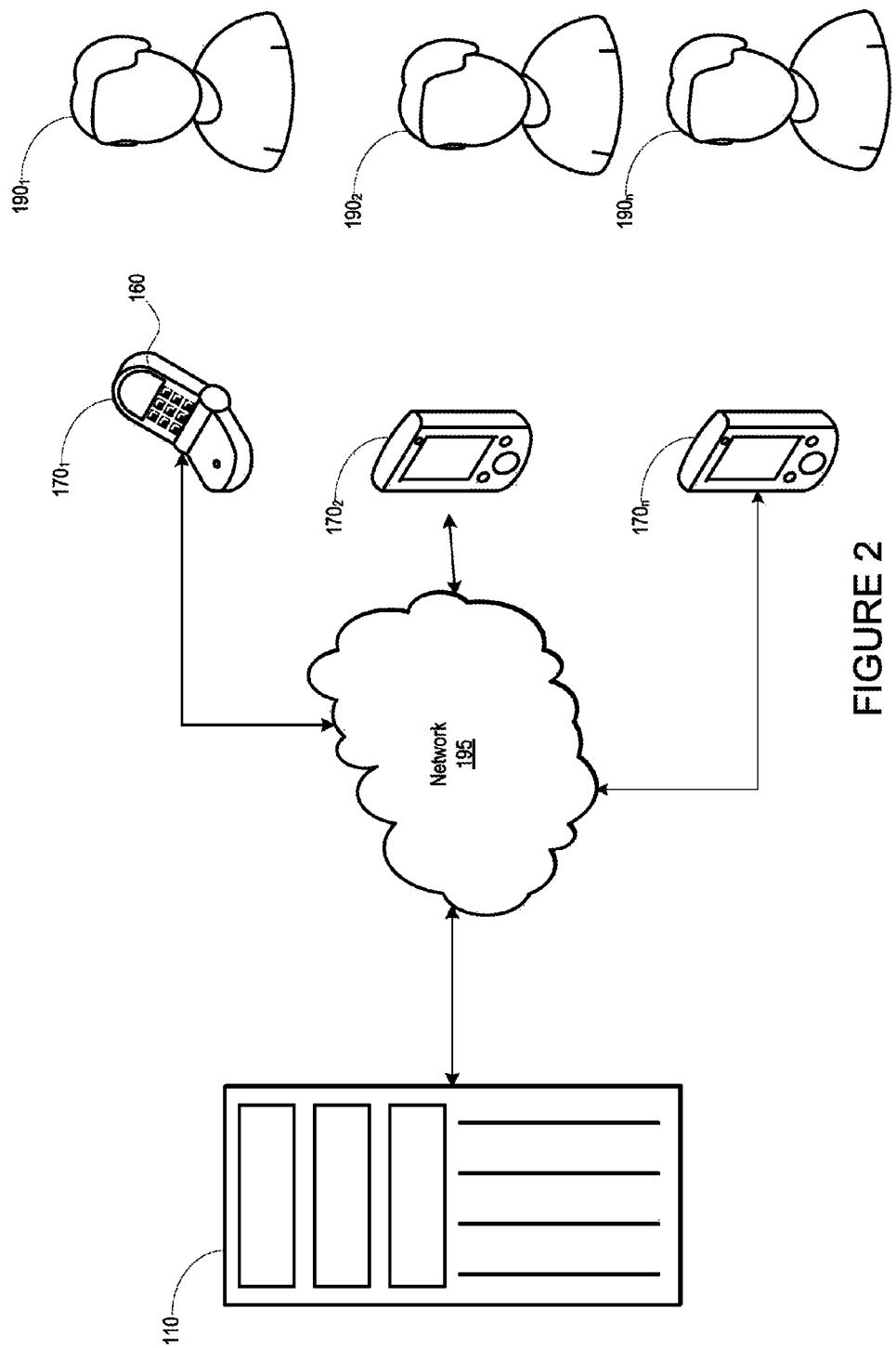
FIG. 2 is an illustration of another example of the server in communication with the multiple client devices in accordance with aspects of the invention.

As shown in FIGS. 1-2, a system 100 in accordance with one embodiment includes a remote server 110 in communication with one or more client devices $170_1, 170_2, \ldots 170_n$. The remote server 110 may include a processor 120, memory 130 and other components typically present in general purpose computers. Memory 130 may store information that is accessible by the processor 120, including instructions 131 that may be executed by the processor 120 and data 135. The memory 130 may be of any type of memory operative to store information accessible by the processor 120, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor 120. For example, the instructions 131 may be stored as computer code on the computer-readable medium. In that regard, the terms "instructions" and "programs" may be used interchangeably herein. The instructions 131 may be stored in object code format for direct processing by the processor 120, or in any other computer language including scripts or collections of independent source code modules that are interpreted on demand or compiled in advance. Functions, methods and routines of the instructions are explained in more detail below (See FIGS. 3-5).

Data 135 may be retrieved, stored or modified by processor 120 in accordance with the instructions 131. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The remote server 110 may also store map-related information within the data 135, at least a portion of which may be transmitted to the client devices 170. For example, the remote server 110 may store map tiles, where each tile is a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom.

The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the remote server 110 is operative to select, retrieve and transmit one or more tiles in response to receiving a geographical location. In some embodiments, the client device 170 may pre-cache and/or store the map information without the need to request map information from the remote server 110.

The processor 120 may be any well-known processor, such as processors from Intel Corporation or AMD. Alternatively, the processor may be a dedicated controller such as an application-specific integrated circuit ("ASIC").

Although FIG. 1 functionally illustrates the processor and memory as being within the same block, it should be understood that the processor 120 and memory 130 may actually comprise multiple processors and memories that may or may not be stored within the same physical housing. Accordingly, references to a processor, computer or memory will be understood to include references to a collection of processors, computers or memories that may or may not operate in parallel.

The computer 110 may be at one node of a network 195 and be operative to directly and indirectly communicating with other nodes of the network. For example, the computer 110 may comprise a web server that is operative to communicate with client devices 170 via the network 195 such that the remote server 110 uses the network 195 to transmit and display information to the user 190 on a display 162 of the client device 170. The remote server 110 may also comprise a plurality of computers that exchange information with different nodes of a network for the purpose of receiving, processing and transmitting data to the client devices; in this instance, the client devices 170 may be at different nodes of the network than any of the computers comprising the remote server 110.

The network 195, and the intervening nodes between the remote server 110 and the client devices 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. Although only a few devices are depicted in FIGS. 1-2, it should be appreciated that a typical system may include a large number of connected computers.

Each client device 170 may be configured similarly to the remote server 110, with a processor 160 and memory 161. As described with respect to the remote server 110, the memory 161 may comprise a set of instructions 167 and a set of data 168. The processor 160 executes the instructions 167 to control operation of the client device 170. In some embodiments, each client device 170 may be a mobile phone operative to wirelessly exchange data with a server over a network such as the Internet and intended for use by a person 190. The client device 170 may have all of the components normally used in connection with a wireless mobile device such as a central processing unit (CPU), memory (e.g., RAM and ROM) storing data and instructions, an electronic display 162 (e.g., a liquid crystal display ("LCD") screen or touch-screen), user input 163 (e.g., a keyboard, touch-screen or microphone), camera 164, a speaker, a network interface component, and all of the components used for connecting these elements to one another. Some or all of these components may all be internally stored within the same housing, e.g. a housing defined by a plastic shell and LCD screen.

The client devices 170 may also include a geographic positioning element 165, such as circuits, to determine the geographic location and orientation of the device. For example, client device 170 may include a Global Positioning System ("GPS") receiver that may determine the latitude, longitude and altitude of the client device 170. The geographic positioning element 165 may also comprise software operative to determine the position of the device based on other signals received at the client device 170. As specific, non-limiting examples, these other signals may comprise signals received from one or more cell phone towers where the client device 170 includes a cell phone, signals received from local Wi-Fi access points, and the like.

In some embodiments, the client device 170 may also include an accelerometer 166 and/or gyroscope to determine the orientation of the device. By way of example only, the client device 170 may determine its pitch, yaw or roll (or changes thereto) relative to the direction of gravity or a plane perpendicular thereto. In that regard, it will be understood that the client device 170 may automatically provide location and orientation data to the user 190, to the remote server 110, or both.

Although the client devices 170 may comprise a mobile phone, the client device may also comprise a personal computer, personal digital assistant ("PDA"): tablet PC, netbook, etc. In this regard, the display 162 may also comprise a monitor having a screen, a projector, a television, a computer printer or any other electrical device that is operable to display information. The user input 163 may also include other components such as a mouse. Indeed, devices in accordance with the systems and methods described herein may comprise any device operative to process instructions and transmit data to and from humans and other computers including general purpose computers, network computers lacking local storage capability, etc.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the remote server 110 and other functions are indicated as taking place on the client devices 170, various aspects of the system and method may be implemented by a single computer having a single processor. It should be appreciated that aspects of the system and method described with respect to the client may be implemented on the server, and vice-versa.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is operative to identify a geographic locations (e.g., lot and block numbers on survey maps). Moreover, a location may define a range of the foregoing.

The system and method may further translate locations from one reference system to another. For example, the remote server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

The remote server 110 and client devices 170 may store additional data as described below. Preferably, this data is anonymized and collected in aggregate, such that no individual client data is revealed. The remote server 110 may receive updates of the location of a user as the user travels from geographic location to geographic location. By way of example, the user may enable his or her client device 170 to transmit the client device's location to the server. The transmission may occur, for instance, when the user uses the client device 170 to display a map and transmits the device's changing latitude/longitude in order to obtain and display the proper map tile.

In some embodiments, the client device 170 determines a current location and transmits the location to the remote server 110 at particular intervals. For example, the client device 170 may perform a location determination operation once every minute. The client device 170 may also report the current location to the remote server 110 every time the current location is updated. In some embodiments, the client device 170 may determine the location of the device and report the location of the device at separate intervals. For example, the client device 170 may determine the location once every minute, and report the location once every five minutes.

The various location determination and reporting intervals may affect a variety of functional aspects of the client device 170. For example, more frequent determination and reporting intervals result in increased temporal and spatial accuracy of the determined and reported locations, respectively. A client device 170 that reports a location to the remote server 110 once every minute will have less "stale" data than a client device 170 that reports once every hour. A client device 170 that determines the current location once every ten seconds will typically display a more temporally accurate location to the user than a device that determines the current location once every five minutes.

The user may be prompted by the client device 170 to confirm that the user desires to transmit his/her location to the server prior to the client device 170 transmitting the user's location to the remote server 110. In some embodiments, the user may opt-out of sharing his/her location with the remote server 110.

The user may further permit the remote server 110 to store a record of the locations that he/she visited, as well as the date and time of the visit. In some embodiments, the user may permit the remote server 110 to establish a weekly routine of the user. The weekly routine may include the geographic location of the user, the time at which the user was at the geographic location, and the duration of time the user spent at the geographic location. The user may also request that the remote server 110 purge the record of the locations that the user visited. The remote server 110 may also automatically periodically purge the record of the locations that the user visited.

Preferably, the system provides privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Preferably, data is anonymized and aggregated such that individual client data is not revealed.

In establishing the weekly routine, the remote server 110 may formulate a spatial index, such as, but not limited to, one or more map tiles defining non-overlapping rectangular geographic regions. The one or more map tiles may represent the geographic locations where the user has stayed. Moreover, the remote server 110 may segment a period of time, such as one week, into a pre-defined number of time segments, such as 168 segments (7 days multiplied by 24 hours). By receiving location updates from the user during the time segments and correlating the location updates with the map tiles, the remote server 110 may generate a distribution map (e.g., a "heat map") of the geographic locations where the user stayed at for each of the time segments. The remote server 110 may generate the distribution map over a predetermined period of time, such as eight weeks.

The remote server 110 may then assign a confidence value representing the likelihood that the user will be at a particular geographic location during one of the 168 time segments. The remote server 110 may determine the confidence value based on normalizing the ratio distribution of the aggregated time segments to the total time segments. Based on this normalization, the confidence value may fall within a range of confidence values, such as between 0 and 10,000. In this embodiment, the higher the confidence value, the more often the user stayed at the map tile at the corresponding time segment. From the distribution maps (e.g., the "heat maps") and the determined confidence values, the remote server 110 may estimate whether the user is likely to appear at a particular geographic location at a particular time segment.

In another embodiment of storing a record of the locations a user has visited, the remote server 110 may maintain two different look-up tables. In this embodiment, a first table may facilitate the quick retrieval of locations based on a time-based factor. By way of example, the locations may be stored by the hour and by day of the week, such as the following Table 1 (hereafter, the "Time-keyed Table"):

TABLE 1

| Day of Week | Hour | List of Locations |
|---|---|---|
| Monday | 12:00 A.M. to 12:59 A.M. | (See Below) |
| Monday | 1:00 A.M. to 1:50 A.M. | |
| — | | |
| Sunday | 11:00 P.M. to 11:59 P.M. | |

In that regard, a list of locations may be readily retrieved based on the day and hour of the week. The list of locations may comprise a list of any geographic locations that the user visited that hour on that day of the week. The locations may further be defined as geographic regions, such as 100 m×100 m squares that correspond with regions covered by detailed (e.g., relatively low-altitude and highly-zoomed) map tiles.

Moreover, the locations may be associated with a value based on the system's determination of the likelihood that the user will be at the particular location during the relevant time period (a "confidence value"). As discussed before, the confidence value may fall within a range of confidence values, such as between 0 and 10,000, where 10,000 represents the greatest likelihood that the user will be at the particular location and zero indicates that it is unlikely that the user will be at the location.

The confidence value may be calculated in accordance with a number of factors, including the frequency that the user has been to that location at that time period in the past. Thus, if a client device transmits locations indicating that the user goes to the same latitude/longitude every Monday through Friday for lunch between noon and 1:00 pm, and the latitude/longitude falls within the region associated with a tile identified by the tile identifier "20", then the time-keyed table may indicate:

TABLE 2

| Day of Week | Hour | List of Locations |
|---|---|---|
| Monday | 12:00 P.M. to 12:59 P.M. | Region 20, Value 10000. |
| Tuesday | 12:00 P.M. to 12:59 P.M. | Region 20, Value 10000. |
| Wednesday | 12:00 P.M. to 12:59 P.M. | Region 20, Value 10000. |

However, if the server receives information indicating that the user visits three different locations in three different regions on Mondays during lunch time, and some locations more often than others, the server may store a list of locations as follows.

TABLE 3

| Day of Week | Hour | List of Locations |
|---|---|---|
| Monday | 12:00 P.M. to 12:59 P.M. | Region 20, Value 5000; Region 25, Value 3000; Region 23, Value 1000. |

In some embodiments, the number of locations for each time period may vary. The list of locations may be sorted by confidence value, such that the first location on the list is the most likely location of the user.

The system 100 may store another collection of information that pre-sorts the user's prior locations by region. For example, the remote server 110 may store a look-up table keyed by the same regions described above (hereafter, the "Region-keyed Table"). Each region, in turn, is associated with a list of time periods, such as the hours of days of the week. Each cell of the table may store the confidence value associated with that location at that time as follows:

TABLE 4

| Region | Monday 12:00 A.M.-12:59 A.M. | Monday 1:00 A.M.-1:59 A.M. | Sunday 11:00 P.M.-11:59 P.M. |
|---|---|---|---|
| Region 20 | (Confidence Value) | (Confidence Value) | (Confidence Value) |
| Region 21 | (Confidence Value) | (Confidence Value) | (Confidence Value) |
| Region 22 | (Confidence Value) | (Confidence Value) | (Confidence Value) |
| — | (Confidence Value) | (Confidence Value) | (Confidence Value) |

Continuing the example data described above, one or more of the values of the Region-Keyed Table may appear as follows:

TABLE 5

| Region | Monday 12:00 P.M.-12:59 P.M. | Monday 1:00 P.M.-1:59 P.M. |
|---|---|---|
| Region 20 | 5000 | 3000 |
| Region 23 | 1000 | 500 |
| Region 25 | 3000 | 1000 |

In some embodiments, the system 100 may base the confidence value on whether the client was stationary at the particular location. By way of example, the system 100 may have a greater degree of confidence that the user will return to a particular location in the future if the user previously spent a predetermine period of time or a particularly long time at the location. Thus, the confidence value associated with a particular location may be much greater if the user previously spent five hours at the location compared to 20 minutes.

The system 100 may also require that the user spend another predetermined period of time, such as a minimum amount of time, at a location before factoring the time/location into a confidence value. For example, if the user spent less than 5 minutes at the same location, the system 100 may not factor that time period or location into its calculation of a confidence value.

As noted above, a location may be defined in different ways, and the system 100 may use a different location reference system for determining whether a user is stationary than it uses to store the user's location history. By way of example, GPS receivers are not always accurate and may return a different latitude/longitude within a certain tolerance even if the user did not move. In other words, the latitude/longitude returned by a receiver may be considered accurate within a certain distance, and that distance may be considered to define a circle around a given latitude/longitude location. For example, the latitude/longitude may be accurate within a distance of 10 feet, 10 yards, 25 yards, or 100 yards. In some embodiments, a user is considered to be stationary if the latitude/longitude locations returned by the GPS receiver falls within that circle.

In some circumstances, the system 100 may not be able to determine which particular region includes the user's location. By way of example, client device 170 may transmit a cell tower ID to remote server 110. If the cell tower's signal is strong enough to include multiple regions, the remote server 110 may not know the precise region in which the user is located.

In such an instance and in some embodiments, the system 100 may divide the highest confidence value among all of the regions in which the user may be located. Thus, if the particular cell tower covers 5 regions, the system may assign a confidence value of 2,000 (10,000 divided by 5) to each of the regions. In another aspect, because the system 100 knows that the user is certainly within one of the regions, it may assign the highest confidence value (e.g., 10,000) to all of the regions.

In some embodiments, the confidence value may change depending on how the user's location was determined. For example, if the user's location was determined based on the client device's 170 presence within the transmission range of a large cell tower, the remote server 110 may assign a smaller confidence value to that location than a location determined by a GPS receiver. In other embodiments, the components and methods used to determine the user's location will have no bearing on the confidence value.

The remote server 110 may use the heat map comprising historical location data of the user to generate a schedule for the user. This schedule may be generated using the time, location, and confidence intervals described above, along with other factors such as heuristics. In some embodiments, the schedule includes references based on temporal and/or spatial data. As an example of temporal data, the schedule may indicate that at a particular time, the user is likely to be at or headed towards a particular destination (e.g., at 8:30 a.m., the user is likely to be headed to work). As an example of spatial data, the schedule may indicate that when the user is at a particular location, they are likely to be headed to a particular destination (e.g., when the user enters the highway using a particular exit, they are likely to be headed to the mall). In some embodiments, the schedule may also combine temporal and spatial factors to develop a confidence value that the user is at or headed towards a particular location. In some embodiments, the remote server 110 may bias in favor of temporal data or spatial data depending upon a difference in the confidence value associated with each (e.g., if a user always and/or regularly travels to a particular destination when entering a highway from a particular exit, bias towards spatial factors even if temporal factors indicate the user is likely to be headed to another destination at that particular time). In some embodiments, the remote server 110 may bias in favor of temporal data or spatial data in response to the type of data the schedule comprises. An embodiment of the manner in which this of this bias factor may be applied is described further with respect to FIG. 5.

The remote server 110 may also use heuristics to identify daily habits. For example, the remote server 110 may examine user heat maps for routes between two destinations, undertaken regularly on weekdays between 8:00 a.m. and 5:00 p.m. The presence of such a route within the historical location data may indicate a regular work commute, which the remote server 110 may identify as such within the schedule. A variety of methods may be implemented for predicting regular behavior. Such methods may involve analysis of the time of day, the day of the week, or the month of the year. Other signals may be used in combination with the historical location data, for example, the current weather as supplied from a third party source, or from the client device.

In some embodiments, the remote server 110 may combine heat map data for multiple users to generate a set of aggregate data. The aggregate heat map data is preferably provided via an "opt-in" process, allowing users to submit their heat map information to improve data reporting functionality for all users. Such data is preferably anonymized to protect user privacy data.

The remote server 110 may generate aggregate schedules using the aggregate data, and the aggregate data may be indexed by certain demographic data. For example, a given schedule may include aggregated data for all users who appear to live in a given neighborhood (i.e., routes for these users typically lead to a residential area in the evening), or users who appear to work at a given workplace (i.e., routes for these users tend to converge at a particular workplace in the morning). In some embodiments, schedules may also be generated based upon external information. For example, a concert venue may provide the remote server 110 with a schedule of upcoming concerts, which the remote server 110 may use to estimate the likelihood that a given user is traveling to the venue.

In some embodiments, the remote server 110 may generate a schedule corresponding to a superset of all aggregate data. This superset schedule is an aggregate of the heat maps and/or schedules of all users, and is not indexed or targeted by any particular demographic data. As above, the user must "opt-in" to supplying information to be used in this manner.

Embodiments of the invention allow for the adjustment of device reporting intervals in accordance with the relationship between the current location of the client device 170 and the likely location of the client device 170 as determined from the schedule described above. An embodiment of a method to perform this adjustment is described further below with respect to FIG. 3.

The methods below describe computer-implemented methods performed by devices, such as the server 110 and the client device 170. These methods generally describe functions that may be performed by a computer processor or processors programmed by software, firmware, or other instructions. Aspects of the methods are generally interchangeable between the server and client. As such, it should be understand that language indicating that "the method" performs an action is attributable to the hardware and software performing the method.

Figure 3:
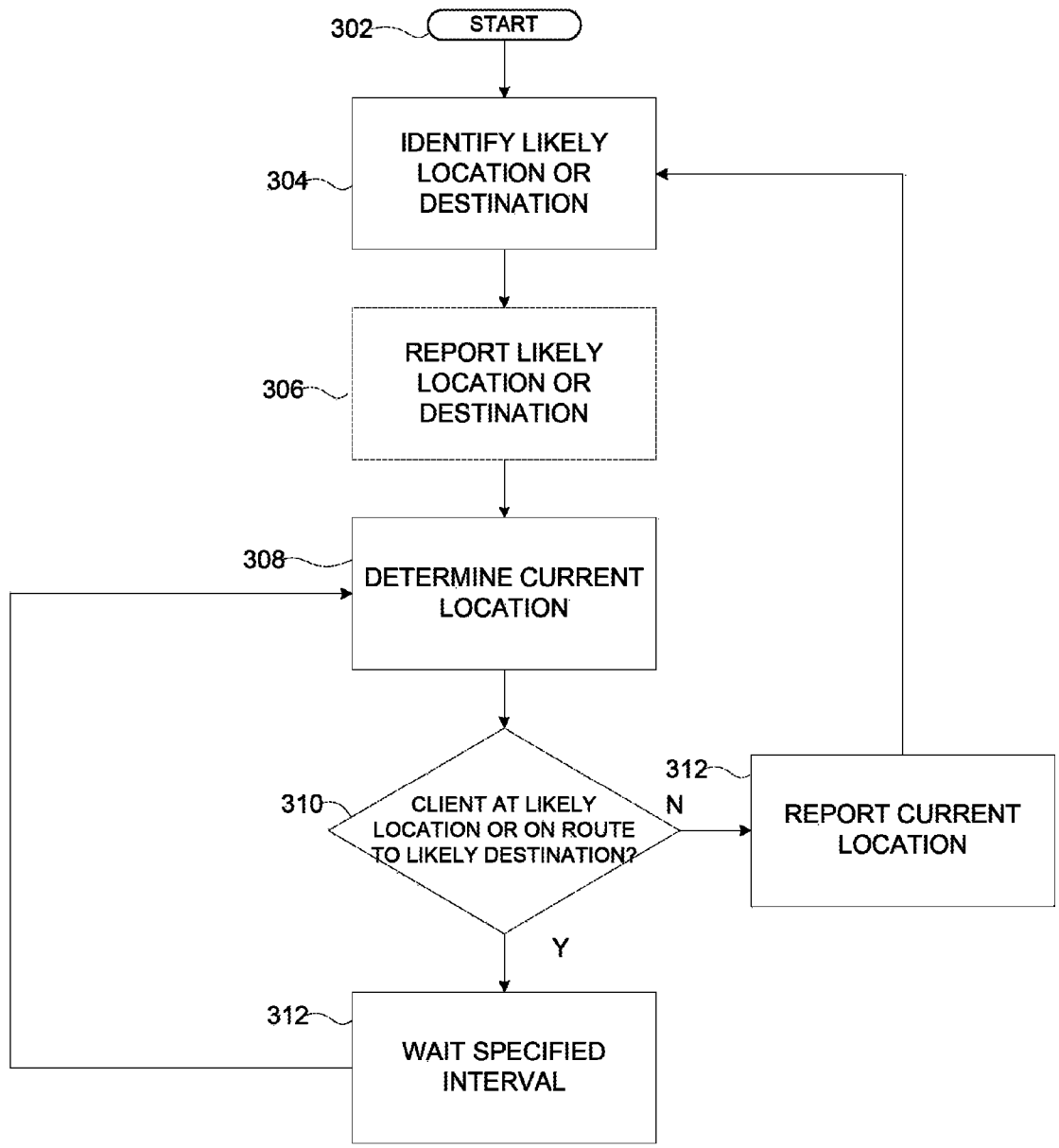
FIG. 3 is a flow diagram depicting an embodiment of a method for reporting the location of a client device in accordance with aspects of the invention.

FIG. 3 is a flow diagram depicting an embodiment of a method 300 for reporting the location of a client device in accordance with aspects of the present invention. The method 300 may represent one embodiment of the instructions 167 for controlling execution of the processor of the client device 170 described with respect to FIGS. 1 and 2. The method 300 begins at step 302, when the reporting functionality of the client device 170 is activated. The method 300 then proceeds to step 304.

At step 304, the method 300 identifies a likely location or destination. In some embodiments, the method 300 may default to identifying the likely location of the user, and only attempt to identify a user destination if the user is determined to be moving. This identification step may be performed by examining a user location history or scheduled as described above with respect to FIGS. 1 and 2. In some embodiments, the likely location or determination step 304 may be performed locally on the client device 170. In some embodiments, the current location of the client device 170 is reported to the remote server 110. The remote server 110 may then determine a likely location or destination, and then transmit the likely location or destination the client device 170.

In some embodiments, the likely location or determination step 304 is performed by the remote server 110 and sent to the client device 170. One implementation of a method for identifying a likely location or destination is described below (See FIG. 4). The method may then optionally proceed to step 306.

At optional step 306, the client device 170 may report the location or destination identified at step 304 to the remote server 110. This allows the client device 170 to inform the remote server 110 that it is likely at a certain location or traveling to a certain destination to allow for synchronization with the remote server 110. This allows the server to predict the client device 170 location without the need to receive location updates from the client. In some embodiments, this synchronization may be unnecessary if the remote server 110 also calculates the likely location or destination, thus obviating the need for the client device 170 to report the outcome of step 304. In embodiments where the remote server 110 calculates the client device 170 location, this prediction may occur without the need for the client device 170 to report the likely location or destination. After optionally reporting the identified likely location or destination, the method 300 proceeds to step 308.

The method 300 proceeds to step 308 after the likely location or destination has been identified. The identification process that occurs in step 304 may result in a likely location, a likely destination, or both. For example, the method may determine that the user is likely at work and unlikely to leave for several hours, resulting in a likely location of the office. As another example, the method might determine that the user is likely traveling home at the end of the work day. As yet another example, the method might determine that the user is traveling home from work, and likely to be approaching certain mile markers along the highway at certain times. Thus method step 304 may identify a location, a destination, or a series of locations along a route to a destination.

The likely location or destination may be determined either locally on the client device 170 or remotely on the remote server 110. In some embodiments, where the likely location or destination is determined by the client device 170 instead of the remote server 110, the method 300 may optionally proceed to optional step 306.

At step 308, the method 300 determines the current location of the client device 170. This determination may be performed in a variety of different manners, including, but not limited to, accessing Global Navigation Satellite System (GNSS) data using a GPS receiver, identifying the location of nearby cellular towers, identifying nearby wireless network access points, allowing the user to specify the current location with a screen prompt, and the like. After determining the current location of the client device 170, the method 300 proceeds to step 310.

At step 310, the method 300 identifies whether the location of the client device 170 as identified during step 308 is within a predetermined area proximate to the likely location or a location on the likely route as determined at step 304. Although the predetermined area is described as "proximate to" a particular location, destination, or user, the term "proximate to" should also be understood as possibly including location, destination, or user itself. For example, a location zero yards from the destination could be understood as being proximate to the destination. In some aspects, the predetermined area is a particular district or location defined in relation to another location. For example, the predetermined area may include "The southeast corner of the park" or "The downtown district of the city". Such areas may be defined by measurements from a particular point or one or more edge boundaries.

In some aspects, the predetermined area is a radius from a particular point. In some embodiments, the predetermined radius may be between 10 and 25 yards, at least about 25 yards, or no greater than 100 yards. If the client device 170 is within a predetermined area proximate to the likely location or a location on the likely route, the method 300 proceeds to step 314. If the client device 170 is not at the likely location or on the likely route, the method 300 proceeds to step 312. The predetermined area may be increased or decreased depending upon the reporting accuracy of the method used to determine the device location. For example, a GPS location is generally more accurate than a location as determined by a cellular tower signal, such that a GPS location would allow for a smaller area and thus more accurate location reporting.

At step 312, the method 300 reports the current location of the client device 170 to the remote server. If the client device 170 is not at the likely location or on the likely route as determined at step 304, then the remote server 110 should be provided with updated information to ensure the remote server 110 is properly aware of the client device's location. After reporting the current location of the device, the method 300 returns to step 304 to determine a new likely location or current destination in view of the newly reported location.

At step 314, when the method 300 determines that the client device 170 is either at the likely location or on the likely route, the method 300 will wait for a specified interval before returning to step 308 to determine the location of the client device 170 again. For example, the method 300 may poll once every minute, once every five minutes, or once every thirty minutes. This allows for the client device 170 to avoid reporting data to the remote server 110 while the device is still at the location the remote server 110 expects. The method 300 thus advantageously allows for an optimization of the reporting function by reporting the location of the client device 170 to the remote server 110 in response to a deviation from a likely location or route. Optimizing the reporting function in this manner allows for a reduction in the amount of data sent to and from the remote server 110, thus prolonging the battery life of the client device. The method 300 may be terminated at any time by the user disabling the location awareness and reporting functionality of the device, such as by exiting the program/application providing such services or powering off the client device 170.

Figure 4:
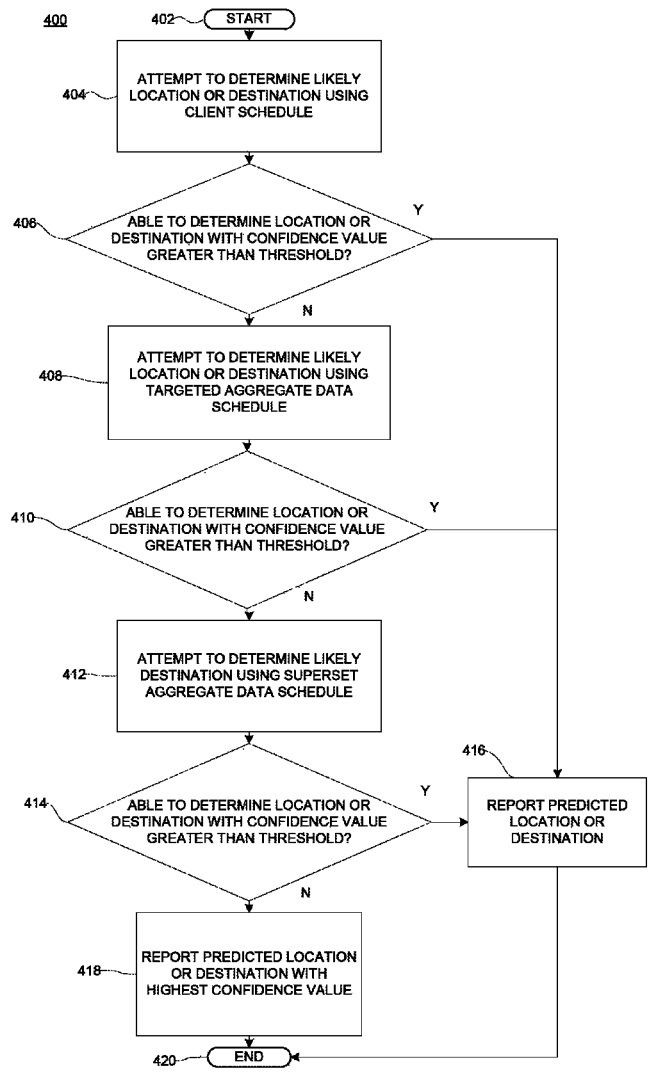
FIG. 4 is a flow diagram depicting an embodiment of a method for identifying a likely location or destination in accordance with aspects of the invention.

FIG. 4 is a flow diagram depicting an embodiment of a method 400 for identifying a likely location or destination in accordance with aspects of the present invention. In some embodiments, the method 400 provides for determination of a likely location or destination as described above with respect to step 304 of FIG. 3. The method 400 may be performed by either the client device 170 or the remote server 110, so long as the performing element had access to schedule information as described above with respect to FIGS. 1 and 2.

The method 400 begins at step 402, where the method 400 has received some indicia for determining a likely location or destination. The indicia may include temporal or spatial data. For example, the method 400 may be aware of the current time of day, or the current location of a user. The method 400 then proceeds to step 404 to begin the process of determining a likely location or destination.

At step 404, the method 400 attempts to predict the location or destination of the client using a client schedule. The client schedule may be a schedule as described above with respect to FIGS. 1 and 2, generated from heat map data. As described above, the client schedule typically comprises spatial and temporal data that describes the travel activities of the user.

The method by which the system determines the predicted location or destination is described further below (See FIG. 5). The outcome of the determination performed at step 404 is typically a predicted location or destination accompanied by a confidence value indicating the likelihood that the prediction is correct. For example, the confidence value may be a percentage chance that the prediction is correct, with the sum total of confidence values for each potential destination equaling 100%. After attempting to determine the predicted location or destination using a client schedule, the method 400 proceeds to step 406.

At step 406, the method 400 performs an analysis on the predicted location or destination and the confidence value as determined at step 404. The method 400 compares the confidence value associated with the predicted location or destination with a threshold value. If the confidence value is greater than the threshold, then it is likely that the user is at the predicted location or traveling to the predicted destination. In some embodiments, the threshold value may be set at 80% to ensure that only predicted locations or destinations with a high probability of accuracy are reported. In some embodiments, the threshold value may be set at 25%, 50%, or 90%, depending upon the degree of accuracy required. The threshold value could be adjusted depending upon the need for accuracy in the predicted value. If the confidence value is equal to or exceeds the threshold value, the method 400 proceeds to step 416. If the confidence value is less than the threshold value, the method 400 proceeds to step 408.

At step 408, the method 400 attempts to use a targeted aggregate data schedule to determine a likely location or destination. The targeted aggregate data schedule is a schedule that includes data from users with similar demographic profiles as the client. Such a profile is typically less likely to produce accurate results than a profile associated with the individual user, but is more likely to produce accurate results than a superset of all aggregate data. An exemplary targeted aggregate schedule may include a schedule produced from a set of heat maps of all users who live in the same neighborhood, or a schedule produced from a set of heat maps of employees of the same corporation. In some embodiments, the user may establish a profile that includes voluntarily submitted demographic data to provide more accurate targeted aggregate schedules. For example, the user may indicate on his profile that he lives on a particular street. His targeted aggregate schedule may then be generated from data supplied by other users who indicate they live on the same street. Other examples of user demographic data include income, interests, work industry, and the like. For example, the method 400 may infer income by determining where the user lives, interests by where the user travels (e.g. baseball games, concerts etc.) and work industry by the location of their work (e.g. tech/sales/banking etc.).

As described above with respect to step 404, step 408 generates a predicted location or destination and a confidence value associated with the prediction. The method 400 then proceeds to step 410 after generating the predicted location or destination and confidence value.

At step 410, the method 400 analyzes the predicted location or destination and confidence value generated at step

408. The method 400 compares the confidence value with a threshold value to determine if it is likely that the predicted location is accurate. As described above, the threshold value may be set at 25%, 50%, 80%, 90%, or any other numerical value, depending upon the degree of accuracy desired. The method 400 may use the same threshold value as described above with respect to step 406, or a different threshold value. As described above, a higher threshold value likely results in more accurate results, but also in a decreased likelihood of generating a useful result. The likelihood of a given set of demographics and superset matching with characteristics of a client specific search may be low. For example, the method 400 may use a lower threshold for matching at a client level as the matching is personalized to the user. For a demographics or superset match, the method may set a higher threshold, because the data is not personalized. Each matching set may have different characteristics so the method 400 may use different thresholds. Using the same threshold for all may result in an incorrect destination, or no valid result at all.

If the method 400 determines that the confidence value is equal to or exceeds the threshold value, the method 400 proceeds to step 416. If the confidence value is less than the threshold value, the method 400 proceeds to step 412.

At step 412, the method 400 attempts to determine a predicted location or destination using a schedule that represents a superset of the aggregate heat map data for all available users. A prediction made from the superset is not keyed to any particular user or demographic information associated with the user. As such, predictions made from a superset schedule may be less accurate than predictions made from client schedules or targeted aggregate schedules. As with steps 404 and 408, step 412 produces a predicted location or destination and a confidence value associated with the prediction. The method 400 then proceeds to step 414.

At step 414, the method 400 analyzes the predicted location or destination and confidence value generated at step 412. The method 400 compares the confidence value with a threshold value to determine if it is likely that the predicted location is accurate. The method may use the same threshold value as described above with respect to step 406 and 410, or a different threshold value. As described above, a higher threshold value would result in more accurate results, but also in a decreased likelihood of generating a useful result. If the confidence value is equal to or exceeds the threshold value, the method 400 proceeds to step 416. If the confidence value is less than the threshold value, the method 400 proceeds to step 418.

At step 416, the method 400 reports the predicted location or destination identified at step 406, 410, or 414 as the likely location or destination. In some embodiments, this likely location or destination is reported to a method for reporting location information as described with respect to FIG. 3. After reporting the likely location or destination, the method 400 ends at step 420.

If the method 400 has been unable to determine a predicted location or destination with a confidence value greater than the threshold value or values, the method 400 proceeds from step 414 to step 418. At step 418, the method 400 reports the predicted location or destination with the highest confidence value as determined at steps 404, 408, and 412 as the likely location or destination. After reporting the location or destination with the highest confidence value, the method 400 ends at step 420.

Figure 5:
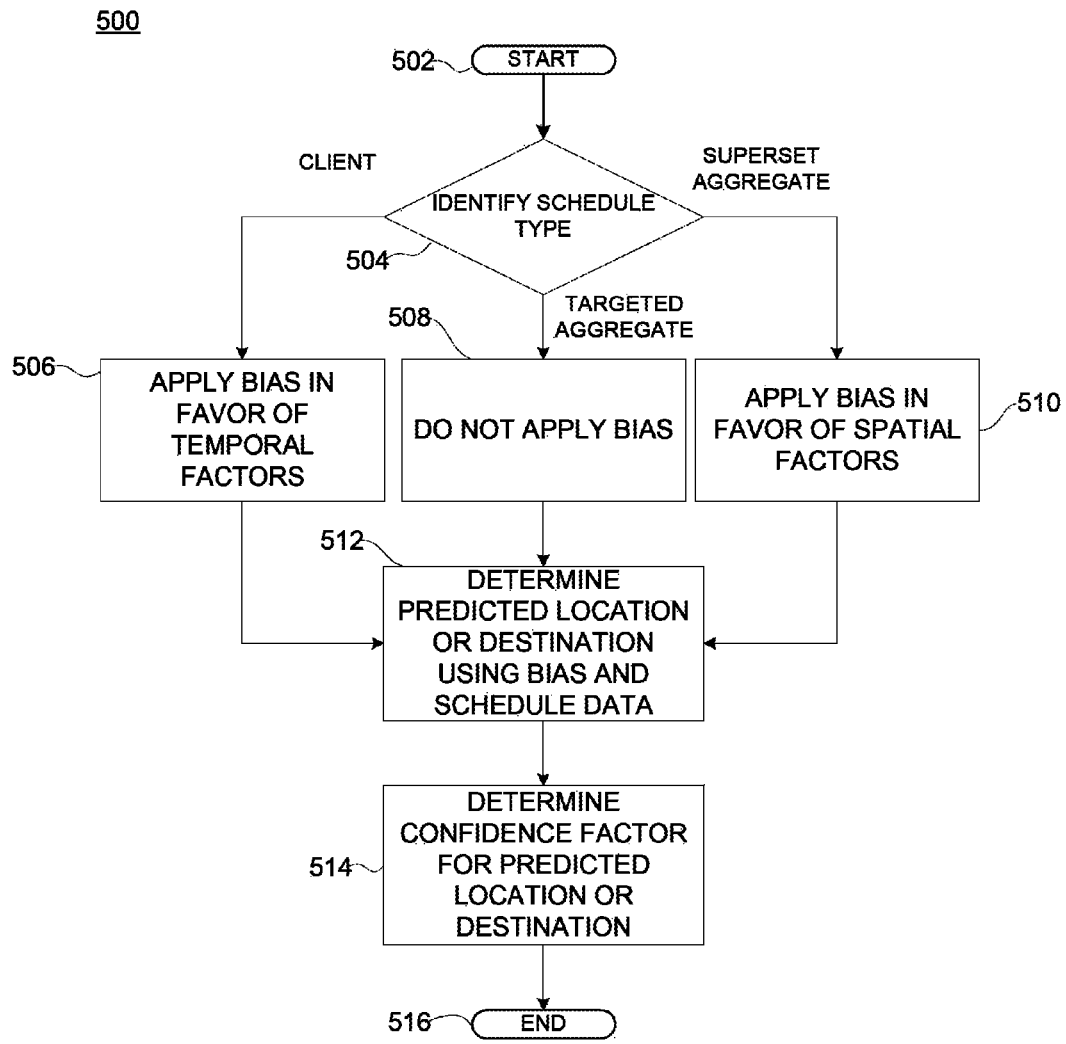
FIG. 5 is a flow diagram depicting an embodiment of a method for determining a likely location or destination using a schedule in accordance with aspects of the invention.

FIG. 5 is a flow diagram depicting an embodiment of a method 500 for determining a likely location or destination using a schedule in accordance with aspects of the invention. In some embodiments, the method 500 is operative to determine a predicted location as described with respect to steps 404, 408, and 412 described with respect to FIG. 4. The method 500 begins at step 502, where a schedule has been specified. The method 500 then proceeds to step 504.

At step 504, the method 500 identifies the type of schedule. Typical schedule types include client specific schedules, targeted aggregate schedules, and superset schedules. Targeted aggregate schedules may further be classified by the size of the demographic cohort with which the schedule is associated. The various schedules may have unique prediction algorithms tailored to the data with which the schedules are associated.

If the method 500 determines the type of schedule is a client specific schedule, the method 500 proceeds to step 506. If the method 500 determines the type of schedule is a targeted aggregate schedule, the method proceeds to step 508. If the method 500 determines the type of schedule is a superset schedule, the method 500 proceeds to step 510.

As described above with respect to FIGS. 1 and 2, the schedules typically comprise data related to both spatial factors (e.g., the user typically travels in X direction when entering the highway at Y exit) and temporal factors (e.g., the user tends to travel to X location at Y time). As such, it may be appropriate to analyze both sets of factors when determining the most likely location or destination for the user. Temporal data may provide more accurate results relating to specific user schedules, while spatial data may be more accurate for larger data sets. As such, it is appropriate to introduce a bias factor in favor of either spatial or temporal factors depending upon the type of data. In the present embodiment, the bias factor is described with respect to the difference between client specific scheduling data and a superset of all aggregate data, specific bias elements could be introduced to location prediction calculations depending upon the particular type of schedule that is examined. Furthermore, while the exemplary bias described relates to a distinction between spatial and temporal data, the method 500 may apply a bias in favor of or against a particular type of spatial or temporal data, or combinations thereof.

At step 506, the method 500 has determined that the schedule is a client specific schedule. As such, in the present exemplary embodiment, it is most appropriate to apply a temporal bias. The method 500 applies a bias factor where factors that indicate that a user will be in a particular place at the current time are weighted more heavily. After applying the bias, the method 500 proceeds to step 512.

At step 508, the method 500 has determined that the schedule is a targeted aggregate schedule. As such, in the present exemplary embodiment, the data is less user-specific than the client schedule, but more specific than the superset of aggregate data. As such, it may not be appropriate to bias in favor of one set of factors or the other. The method 500 therefore applies no bias and proceeds to step 512.

At step 510, the method 500 has determined that the schedule is a superset aggregate schedule. As such, in the present exemplary embodiment, it is most appropriate to apply a bias in favor of spatial bias. The method 500 applies a bias factor where factors that indicate that users generally travel to a particular destination when at a particular starting location are weighted more heavily. After applying the bias, the method 500 proceeds to step 512.

At step 512, the method 500 predicts the location or destination of the client device 170. In some embodiments, the method 500 is aware of the location of the client device 170, such as provided by the geographic positioning element 165 described with respect to FIGS. 1 and 2. The method 500 may compare the current location with data from the schedule to ascertain the most likely location or destination using spatial and/or temporal factors that the schedule comprises. The method 500 may also apply a bias in favor of a particular set of factors as described with respect to steps 506-510. For example, the client device reports its location to the remote server along with a client identifier, such that the remote server can identify the client device and a location. The server may then use the client identifier to access the heat map for that particular user or client device and, if needed, the heat maps for the demographics into which the user falls. After determining a predicted location or route, the method 500 proceeds to step 514.

At step 514, the method 500 determines a confidence value associated with the prediction generated at step 512. Step 514 may be performed concurrently with step 512, with locations or destinations evaluated based upon the associated confidence value. After determining a confidence value for the prediction generated at step 512, the method 500 ends at step 514, where the results are typically evaluated by another method, such as the method 400 described with respect to FIG. 4.

In this manner, the client device 170 attempts to minimize the number of location reports sent to the remote server 110, while also providing accurate data. The client device 170 thus maximizes battery life by preventing location reporting when the device is already in the location the server expects. The location or destination of the client may be predicted by performing analysis of one or more schedules and/or heat maps associated with the client. In some embodiments, the schedules are generated from heat maps. Different schedules are typically associated with different datasets, such as client/user specific schedules, targeted aggregate data schedules, and superset schedules. Accordingly, the methods and system described herein provide a flexible and efficient way of managing client device location reporting functionality.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible embodiments.

The invention claimed is:

1. A computer-implemented method for determining a likely location or destination of a first user device of a plurality of user devices, the method comprising:
   storing, in a memory, historical data comprising spatial data and temporal data, the spatial data describing one or more geographical locations reported by at least one of the first user device and the plurality of user devices and the temporal data describing one or more times at which the at least one of the first user device and the plurality of user devices was present at the one or more geographic locations;
   analyzing the historical data, with a processor in communication with the memory, to generate a plurality of schedules, each of the plurality of schedules associated with a different dataset of the historical data and comprising one or more times and one or more geographic locations, where each of the one or more times is associated with at least one of the one or more geographic locations;
   determining a most likely location or most likely destination of the first user device using one or more of the plurality of schedules;
   determining a confidence value for a predicted location or destination predicted by a comparison with a particular schedule;
   comparing the confidence value with a threshold value; and
   determining a predicted location or a predicted destination is a likely location or a likely destination in response to the confidence value being equal to or exceeding the threshold value.

2. The method of claim 1, further comprising:
   determining that the first user device is in motion; and
   comparing a current location of the first user device to the schedule to determine the most likely destination of the first user device.

3. The method of claim 1, wherein the determining comprises:
   analyzing the schedule to determine a most frequently visited location or destination associated with a particular time.

4. The method of claim 3, wherein the particular time is a local time of the first user device.

5. The method of claim 1, wherein the determining comprises:
   analyzing the schedule to determine a most frequently visited location or destination associated with a particular location.

6. The method of claim 5, wherein the particular location is the location of the first user device.

7. The method of claim 1, wherein the determining step further comprises:
   applying a bias between temporal factors and spatial factors used to determine the most likely location or destination based upon the contents of the schedule.

8. The method of claim 1, wherein the determining comprises:
   attempting to determine the most likely location or most likely destination using a schedule associated with at least one of a particular user or the first user device.

9. The method of claim 1, wherein the determining comprises:
   attempting to determine the most likely location or most likely destination using a schedule associated with a particular set of demographic data.

10. The method of claim 1, wherein the determining step further comprises:
    attempting to determine the most likely location or most likely destination using a schedule associated with a superset of all available historical data.

11. The method of claim 1, further comprising:
    comparing the geographic location to another schedule in response to the confidence value being less than the threshold value.

12. The method of claim 11, further comprising associating a second threshold value with the another schedule.

13. The method of claim 11, further comprising:
    selecting a predicted location with a maximum confidence value from a plurality of predicted locations, in response to none of the plurality of predicted locations exceeding the threshold value.

14. A processing system for processing personalized user location information, comprising:
    at least one processor;
    a location prediction engine associated with the at least one processor; and memory for storing data, the memory coupled to the at least one processor;

wherein the location prediction engine is configured to analyze a set of historical location data to generate a plurality of schedules, each of the plurality of schedules associated with a different dataset of the historical data, to determine a most likely location or a most likely destination of the first user device using one or more of the plurality of schedules, to determine a confidence value for a predicted location or destination predicted by a comparison with a particular schedule, to compare the confidence value with a threshold value, and to determine a predicted location or a predicted destination is a likely location or a likely destination in response to the confidence value being equal to or exceeding the threshold value, and wherein each of the plurality of schedules comprise one or more times and one or more geographic locations, where each of the one or more times is associated with at least one of the one or more geographic locations.

15. The processing system of claim 14, wherein the location prediction engine is further configured to compare a current location of the user device with at least one location entry within one or more of the plurality of schedules to determine the most likely destination.

* * * * *